United States Patent [19]

Portier et al.

[11] Patent Number: 5,534,143

[45] Date of Patent: * Jul. 9, 1996

[54] MICROBUBBLE GENERATOR FOR THE TRANSFER OF OXYGEN TO MICROBIAL INOCULA, AND MICROBUBBLE GENERATOR IMMOBILIZED CELL REACTOR

[75] Inventors: Ralph J. Portier, Baton Rouge, La.; Huazhong Mao, Edmonton, Canada

[73] Assignee: Louisiana State University Board of Supervisors, a Governing body of Louisiana State University Agricultural and Mechanical College, Baton Rouge, La.

[*] Notice: The portion of the term of this patent subsequent to Sep. 18, 2010, has been disclaimed.

[21] Appl. No.: 378,072

[22] Filed: Jan. 25, 1995

Related U.S. Application Data

[60] Continuation of Ser. No. 109,623, Aug. 20, 1993, abandoned, which is a division of Ser. No. 584,075, Sep. 18, 1990, Pat. No. 5,240,598.

[51] Int. Cl.$^6$ .................................................. C02F 3/10
[52] U.S. Cl. ................................. 210/151; 210/205
[58] Field of Search .......................... 210/617, 618, 210/150, 151, 177, 180, 184, 205; 435/240.23, 240.24, 284, 288, 299, 313, 818

[56] References Cited

U.S. PATENT DOCUMENTS

| | | | |
|---|---|---|---|
| 3,865,721 | 2/1975 | Kaelin | 210/208 |
| 3,933,640 | 1/1976 | Kirk et al. | 210/256 |
| 3,960,657 | 6/1976 | Bowley | 435/818 |
| 3,963,619 | 6/1976 | Cailland et al. | 210/256 |
| 4,376,045 | 3/1983 | Siskind | 210/208 |
| 4,627,917 | 12/1986 | Morper | 210/617 |
| 4,749,493 | 6/1988 | Hicks | 210/617 |
| 4,810,377 | 3/1989 | Kato et al. | 210/150 |
| 4,833,083 | 5/1989 | Saxena | 435/240.24 |
| 4,931,183 | 6/1990 | Klein et al. | 210/614 |
| 4,954,257 | 9/1990 | Vogelpohl et al. | 210/607 |

*Primary Examiner*—Thomas Wyse
*Attorney, Agent, or Firm*—Llewellyn A. Proctor, Sr.; John H. Runnels; Warner J. DeLaune, Jr.

[57] ABSTRACT

A microbubble generator is disclosed for optimizing the rate and amount of oxygen transfer to microbial inocula or biocatalysts in bioreactor systems. The microbubble generator, and an associated immobilized cell reactor, are useful in the detoxification and cleanup of non-volatile polymeric and volatile organic-contaminated aqueous streams. In particular, they are useful in the continuous mineralization and biodegradation of toxic organic compounds, including volatile organic compounds, associated with industrial and municipal effluents, emissions, and ground water and other aqueous discharges. One embodiment of the invention includes a microbubble chamber packed with small inert particles through which a liquid effluent and oxygen or another gas are admitted under pressure, followed by a venturi chamber to further reduce the size of bubbles.

9 Claims, 3 Drawing Sheets

MICROBUBBLE GENERATOR FOR THE TRANSFER OF OXYGEN TO MICROBIAL INOCULA, AND MICROBUBBLE GENERATOR IMMOBILIZED CELL REACTOR

This application is a continuation of application Ser. No. 08/109,623, filed Aug. 20, 1993, now abandoned; which is a divisional of application Ser. No. 07/584,075, filed Sep. 18, 1990, now U.S. Pat. No. 5,240,598.

FIELD OF THE INVENTION

This invention relates to a microbubble generator for use in optimizing the rate and amount of oxygen transfer to microbial inocula or biocatalysts in bioreactor systems. In particular, it relates to a microbubble generator and immobilized cell reactor as an apparatus combination useful for the detoxification and cleanup of non-volatile polymeric and volatile organics-contaminated aqueous streams, preferably the latter.

BACKGROUND

Organic pollutants from diverse agricultural, municipal and industrial facilities, and waste sites partition preferentially into the soil, water or air phases and spread rapidly throughout the environment. Many of these materials, even in small concentrations, adversely affect life forms, and create serious environmental threats. Toxicity, carcinogenicity, and mutagenicity are the most critical biological properties of a potential pollutant, a very large number of organics of which have been identified by the U.S. Environmental Protection Agency as particularly threatening. For example, the widespread use over the last few decades of herbicides, pesticides and related high risk chemicals, e.g., organochlorines, polychlorobiphenyls (PCB's) and chlorinated phenols, have resulted in serious environmental metal problems. In application Ser. No. 519,793 filed May 7, 1990 by David D. Friday and Ralph J. Portier, there is disclosed a continuous flow, immobilized cell reactor, and bioprocess, for the detoxification and degradation of volatile toxic organic compounds. The reactor is closed, and provided with biocatalysts constituted of specific adapted microbial strains immobilized and attached to an inert porous packing, or carrier. A contaminated groundwater, industrial or municipal waste, which is to be treated is diluted sufficiently to achieve biologically acceptable toxicant concentrations, nutrients are added, and the pH and temperature are adjusted. The contaminated liquid is introduced as an influent to the closed reactor which is partitioned into two sections, or compartments. Air is sparged into the influent to the first compartment to mix with and oxygenate the influent with minimal stripping out of the toxic organic compounds. The second section, or compartment, is packed with the biocatalyst. The oxygenated liquid influent is passed through the second compartment substantially in plug flow, the biocatalyst biodegrading and chemically changing the toxic component, thereby detoxifying the influent. Non toxic gases, and excess air from the first compartment, if any, are removed through a condenser located in the overhead of the reactor. Liquids are recondensed back to the aqueous phase via the condenser.

In the reactor described in the application, supra, the air in the form of a high velocity jet is sparged into the first compartment of the reactor and combined with the conditioned liquid influent at high gas/liquid shear conditions, under pressure, to create very fine bubbles. The mixed phases of air and liquid are flowed through a bed packed with a solid inert packing, e.g., glass beads, then through an open tubular column to a packed bed of biocatalyst. Good mixing, with minimum stripping of the toxic organic compounds from the liquid, is obtained. The pressure increases the oxygen driving force, and the high gas shear provided by the method of contact between the gas and liquid, and solid inert packing, under pressure minimizes bubble diameter and increases the interfacial transfer area between the phases. By small bubble formation and good mixing with good air/liquid contact at elevated pressure, the volume of air that is introduced into the reactor is minimized. Consequently, a lesser amount of the volatile organic compounds are stripped from the liquid and a greater concentration of the volatile organic compounds are contacted, with the biocatalyst and mineralized to detoxify the influent stream. Whereas the apparatus described in this application has proved admirably suitable for admixing the liquid and oxygen influent phases introduced into the reactor, with minimal stripping of the volatile organics by the gas, there nonetheless remains need for alternate bubble generation devices, as well as a need for improved bubble generation devices. There also remains a need for reactors of improved design for carrying out these types of reactions due principally to the volatility of many of the chemical toxicants targeted for detoxification biodegration.

OBJECTS

It is, accordingly, a primary objective of this invention to satisfy these and other needs.

In particular, it is an object to provide a novel microbubble generator for achieving high transfer rates and dissolved oxygen levels with air or other oxygen-containing gas, under pressure, by generating bubbles of diameter approaching the cell diameter of a great number, if not most of the known microorganisms.

A more specific object is to provide a microbubble generator, as characterized, and immobilized cell reactor combination useful for the continuous mineralization and biodegradation of toxic organic compounds, notably volatile organic compounds associated with industrial and municipal effluents, emissions, ground water and other aqueous discharges, especially at conditions which provide optimum or near-optimum detoxification of said toxic streams.

THE INVENTION

These objects and others are achieved in accordance with the present invention which embodies a microbubble generator useful in facilitating, improving, or achieving high oxygen transfer rates and dissolved oxygen levels in microbiologically-mediated processes, or processes wherein the transfer of the oxygen to microbial inocula, or biocatalysts, is required.

The apparatus, in one of its aspects, is comprised generally of an initial, or first chamber, generally termed a microbubble chamber, packed with spherical inert solids particles of small diameter, inlets through which oxygen or en oxygen-containing gas, suitably air, and a liquid influent can be admitted under pressure into the chamber and contacted together to form a mixed liquid-gas phase, or liquid stream in which the gas is dispersed as small bubbles, and an outlet through which the mixed liquids-gas phase is removed from the chamber. The apparatus further includes a second chamber or tubular section, of venturi configuration provided with an inlet through which the mixed liquid-gas phases are forced under pressure to further reduce the size of the bubbles of the mixed liquid-gas phases, and an outlet for discharge of the mixed liquid-gas phases.

In its more preferred form, the microbubble generator is constituted generally of a dual compartmented vessel, a chamber of generally venturi configuration surrounded by an enclosing outer compartment, or chamber. The microbubble, or outer chamber is filled with non-reactive or inert spherical particles, e.g., glass beads, and provided preferably at one of its ends, or sides, with inlets through which an influent liquid and an oxygen-containing gas can be introduced into said microbubble chamber, and admixed. An outlet at the opposite end, or side of the chamber constitutes an inlet to the chamber of venturi configuration. The mixed liquid-gas phases are introduced into this inlet to the second chamber, or chamber of venturi configuration, and forced under pressure through the constructed cross-section thereof to further reduce the size of the bubbles of the mixed liquid-gas phases. The mixed liquid-gas phases are then discharged via an outlet from the second, or venturi-shaped chamber.

The microbubble generator is found particularly useful in combination with bioreactor systems to increase the oxygen transfer rates and dissolved oxygen levels in microbiologically-mediated reactions, as e.g., in the mineralization of polymeric or complex carbon substrates in waste waters where high oxygen demand is necessary, or biodegradation of volatile toxic organic compounds as present in contaminated ground water and waste water from industrial, municipal or other sources. In this form, an oxygenated liquid from the microbubble generator is thus introduced as an influent with compressed air into a biological reactor, suitably an immobilized cell reactor, wherein a continual oxygen transfer to a microbial mass is facilitated by the small bubble diameter and large number of bubbles which increases the rate, or quantity of the metabolic end products from the reactor. A microbubble generator of this type allows super saturated dissolved oxygen levels to be achieved in a bioreactor system by generating a large number of bubbles approaching the cell diameter of most microorganisms, generally of average cell diameter ranging from about 0.10 millimeters (mm) to about 3 mm, or even from about 0.25 mm to about 1 mm, which is preferred. At these small bubble diameters theoretical transfer rates of about 16% to 18% are readily achievable in virtually any fluidized bed, packed bed, or activated sludge reactor system. The bed life of a reactor, it is found, is promoted by an optimal or near-optimal transfer of oxygen to the biomass. Kinetic removal rates are optimized as a result of the improved oxygen transfer, this providing reduced compressed air capacity with high degradation of the treated material, and minimal attrition or damaging of the carrier bed during the operation. Since bed life is promoted, significant economic advantages are realized in the establishment of a biocatalytic unit having an operational life generally measured in years of operation rather than in weeks or months.

The microbubble generator, in a preferred combination is thus employed as the first stage of a bioreactor unit. The microbubble generator is used to oxygenate under pressure a liquid stream containing e.g., a toxic volatile organic compound, diluted as necessary with water and provided with nutrients to optimize the concentration of the toxic organic compound and nutrient concentration, to a bioreactor for microbial attack by selected microorganisms having a high metabolic uptake rate. In an initial step, foreign solids particulates may be removed, if necessary, from the contaminated raw aqueous liquid, e.g., via filtering. The liquid, from which particulate solids have been removed, can then be diluted with water to the degree necessary to provide biologically acceptable toxicant concentrations for the immobilized microorganisms of the catalyst selected to carry out the microbial attack. Nutrients (e.g., K, P, N) such as are needed to provide the energy and growth of the selected microorganisms are added, and the temperature of the liquid is adjusted. An acid, e.g., a mineral acid such as HCl, or a base, e.g., NaOH, is added as may be required to adjust the pH of the liquid to that at which the reaction is to be conducted. In general, the temperature of the contaminated liquid fed into the reactor is adjusted to, and maintained within, a range from about 25° C. to about 35° C., preferably from about 28° C. to about 32° C., and pH ranging from about 6 to about 8, preferably from about 6.8 to about 7.2, dependent largely on the specific nature of the microorganisms used to form the biocatalyst employed in the packed bed portion of the reactor. The reactor into which the conditioned influent is fed is operated in a closed flow system under pressure, suitably at pressure ranging from about 15 pounds per square inch gauge (psig) to about 50 psig, preferably from about 30 psig to about 40 psig, dependent also on the specific nature of the organism.

A preferred microbubble generator, microbubble generator-reactor combination, and the principles of operation of both will be more fully understood by reference to the following detailed description, and to the drawing to which reference is made in the description. The various features and components in the drawing are referred to by numbers, similar features and components being represented in the different views by similar numbers. Subscripts are used in some instances with numbers where these are duplicate parts or components, or to designate a sub-feature or component of a larger assembly.

REFERENCE TO THE DRAWING

The combination is constituted generally of a microbubble generator and an instrumented bioconversion reactor. The unit as a whole further includes storage reservoirs for pH adjustment, interconnecting piping and valve manifold, pumps, thermostats and flow control regulation devices, and a free-standing control panel which houses process monitoring devices and signal conditioning electronics. For simplification most of these components of the unit other than the microbubble generator and reactor are not shown, or are illustrated schematically.

Figure 1:
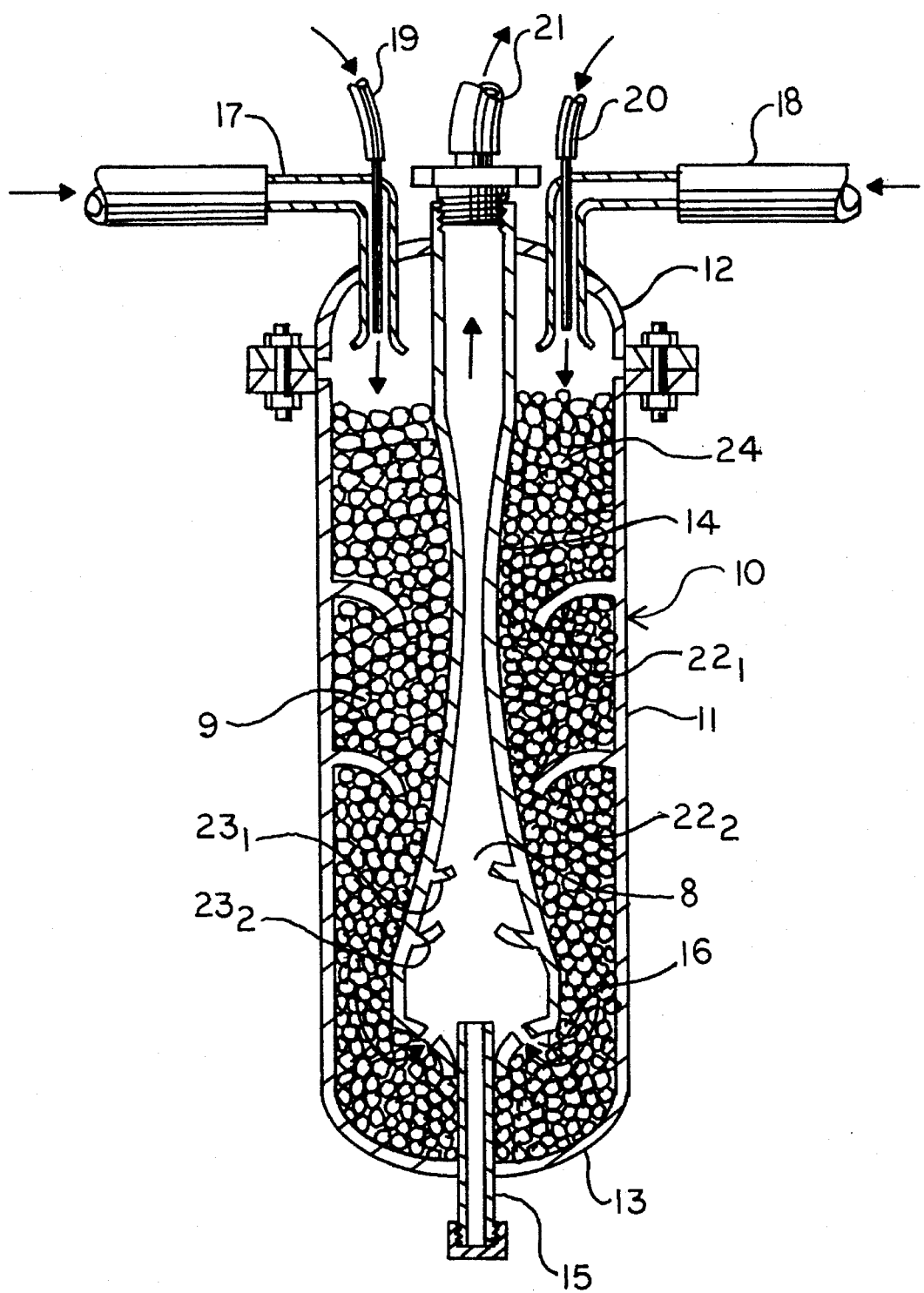
FIG. 1 depicts a sectional side elevation view of the microbubble generator.

Referring to FIG. 1, the microbubble generator is constituted of a dual compartmented vessel 10, a first compartment, or chamber 9 defined by the space within the enclosing side wall 11, top wall 12 and bottom wall 13, and second compartment, or chamber 8, defined by the space inside the enclosing wall 14 which defines generally a vertically oriented tubular member of venturi configuration. The tubular member 14 is vertically supported, essentially concentrically within the confines of the enclosing side wall 11 of the vessel at the top wall 12, through which the member is projected and attached, and at its bottom end via a drain tube 15 which is projected through the bottom wall 13 of the vessel, to which it is attached. An outlet 21 provides a means for the removal of gases and liquids from the chamber 8 of tubular member 14. Web connections provide a means for attachment of the bottom end of drain tube 15 to the tubular member 14, while at the same time leaving an essentially annular passageway, or inlet 16, for communication between chambers 8, 9. The drain tube 15 during normal operation is closed. It is opened for draining off excess or by-product liquid during shut down periods. A liquid influent is introduced into the outer, or first compartment, or chamber 9, via inlets 17, 18, and an oxygen-containing gas, suitably air, via inlets 19, 20, which are concentrically mounted within the liquid inlets 17, 18; all of which are located in the top wall 12 of the enclosing wall 11 of the microbubble generator 10. A gas introduced under pressure via inlets 19, 20 into the very center of the axis of flow of the liquid, introduced via inlets 17, 18 immediately begins to form bubbles within the entering liquid.

The inside face of the enclosing side wall 11 is provided with a series of two or more spaced apart, generally parallel, concentrically mounted baffles $22_1$, $22_2$ which direct the mixed phase flow of liquid and gas toward the axis, or center of the vessel 10. Baffles $23_1$, $23_2$ of similar construction and orientation are mounted on the inside face of wall 14 these also directing the mixed phase flow of liquid and gas toward the axis, or center of tubular member 14 as these phases are directed toward and forced through the restricted cross-sectional area, or orifice portion of the tube. The chamber 9 in operation is filled with small diameter spherical solids particles 24 which are inert, or non-reactive with the processed materials, these shearing the gas and aiding the formation of a large number of bubbles of small diameter within the compartment, or chamber 9; and the formation of a larger number of bubbles of even smaller diameter within the chamber 8 when the mixed liquid-gas phase stream is forced therethrough. An oxygen-containing gas, preferably air, combined with the liquid at these conditions creates very fine gas bubbles, generally bubbles of average diameter ranging from about 0.10 to about 3 mm, and most often from about 0.25 mm to about 1 mm, sufficient to obtain good mixing and oxygen mass transfer. An opening, not shown, which is closed, covered or capped during normal operation can be provided within the enclosing side wall 11 for charging, or removing, the inert solids particles 24; or this function can be provided by removal of the top wall 12 which constitutes a cover or capping member for the vessel 12.

Figure 2:
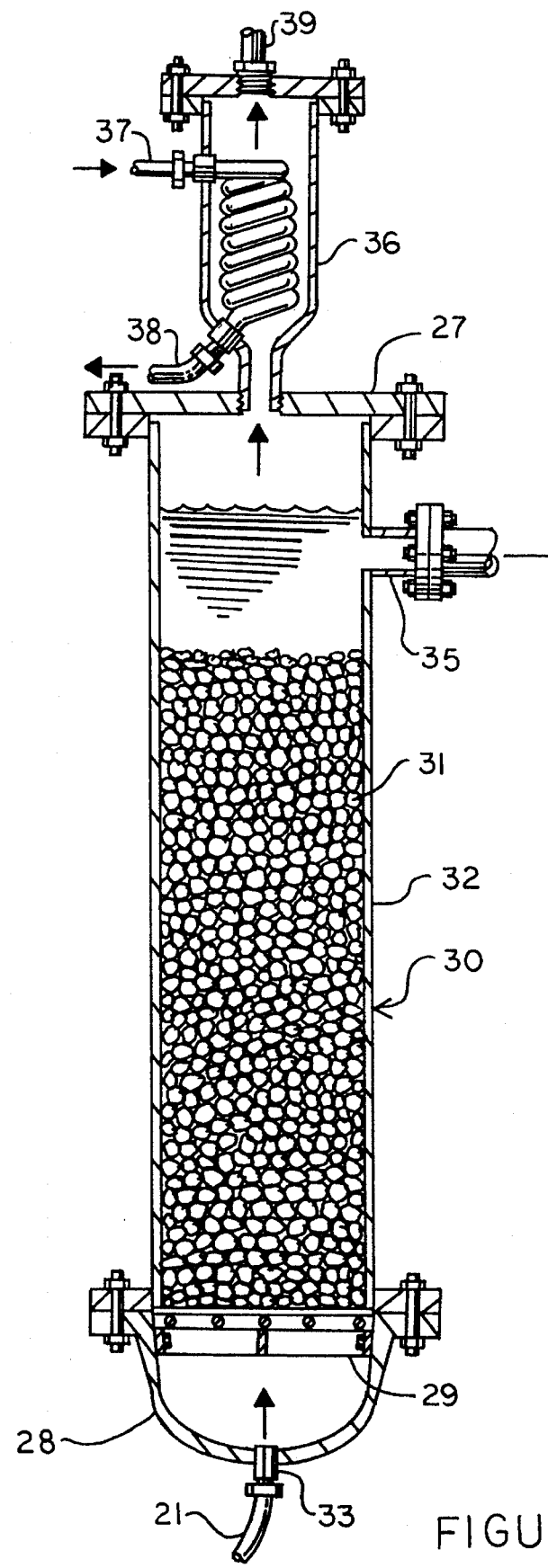
FIG. 2 depicts the combination of the microbubble generator and cross-section of the reactor.

Referring to FIG. 2, the bioconversion reactor 30 is constituted generally of a vertically oriented vessel of elongate, or tubular shape, formed by the enclosing side wall 32, top cover 27 and bottom cover 28. The reactor 30 is packed with a bed 31 of particulate biocatalyst composition supported upon the porous distribution medium, perforated plate or frit 29 located at the lower end of the enclosing side wall 32. An inlet 33, located in the bottom cover 28 of the reactor 30, provides a means for the continuous introduction of a stream of the mixed liquid-gas phases from the microbubble generator 10 via line 21 into the reactor. The oxygenated liquid stream, on entering the reactor, is flowed continuously upwardly through the biocatalyst bed 31, and is removed from the reactor via overflow through line 35. A portion of the treated stream may be recycled with the influent of fresh feed to increase the fluid retention time and control the extent of toxic compound conversion within the reactor. Suitably, the retention time of the liquid within the reactor ranges from about 8 hours to about 36 hours, preferably from about 12 hours to about 16 hours. High recycle rates of the treated stream:fresh feed are preferred, the recycle rate of the treated stream:fresh feed ranging from about 10:1 to about 100:1, preferably from about 50:1 to about 75:1.

The reactor is pressurized by the gas sufficiently that on the introduction into the reactor of an organics-containing, or gas or vapor-containing, aqueous liquid, as found e.g., in contaminated ground water or in an industrial or municipal stream, the organics or gas and vapor will be maintained in or solubilized back into the aqueous phase. The pressure also regulates and controls the amount and transfer rate of dissolved oxygen to the immobilized biomass or biocatalyst bed, this permitting optimal oxygen transfer to the entrenched biomass with minimal attrition or damaging of the carrier bed during operations. Bed life is promoted, providing a biocatalytic unit having an operational life measured in years rather than in months, or weeks as generally occurs in conventional processing. In general, the total pressure maintained on the reactor during operation ranges from about 15 psig to about 50 psig, preferably from about 30 psig to about 40 psig.

A liquid level control, not shown, maintains the level of the liquid in the reactor, the water being removed from the reactor via line 35. Gas rises into the overhead condenser 36 of the reactor, condensate being returned to the liquid surface of the reactor on contact with the copper coils, cooled via liquid coolant entering therein via line 37 and exiting therefrom via line 38. Gas passes out of the overhead of the reactor via line 39.

The microorganism immobilized and attached to the surface of the catalyst support is selected, with the conditions of operation imposed thereon, to drive the reaction to produce maximum breakdown of the toxic organic compound, or compounds, to non-toxic components. The liquid in the reactor is maintained and controlled by a level controller, not shown, at a level above the upper surface of the bed; liquid influent being continuously added to the bottom of the reactor via line 21, and withdrawn from the upper portion of the reactor via line 35. Liquid effluent withdrawn from the reactor via line 35, for recycle, is reconditioned by readjustment of the dilution factor, nutrient concentration, temperature and pH, and then oxygenareal and recycled to the reactor.

Streams containing a wide variety of toxic organic compounds can be detoxified pursuant to the practice of this invention, particularly compounds having Henrys' Law Constants ranging from 0.025 dimension less mole fraction, and greater. These include aliphatic and aromatic hydrocarbons, and the halogenated derivatives thereof a large number of which are listed on the EPA List of Priority Pollutants. [Keith L. H. and Telliard W. A., Priority Pollutants, a Perspective View, *Environmental Science and Technology*, Vol. 13, pp. 416–423 (1979).]

With the preferred biocatalysts the halflives of most toxic volatile organic, or toxic volatile halogenated organic compounds will rarely exceed one day, and most will range between about 4 hours and 16 hours. It has been found that such organic compounds as benzene, toluene, ethyl benzene and xylenes, or such halogenated organic compounds e.g., 1,1-dichloroethane, 1,2-dichloroethane, methyl chloroform, 1,1,2,2-tetrachloroethane, hexachloroethane, bromoethane, and 1,2-dibromoethane, respectively, contained in a conditioned liquid can be 99.9%, by weight, converted to non-toxic products at a total reactor residence time ranging below one day via the use of biocatalysts utilizing immobilized microorganisms of a select class which can metabolize the organic or halogenated organic compounds as carbon and energy sources, e.g., a strain of *Xanthobacter autotrophicus*. *Xanthobacter autotrophicus* is member of a known biologically unique group of bacteria which have the ability to grow chemolithoautotrophically in gas atmospheres containing hydrogen, oxygen and carbon dioxide. These are species which are able to obtain energy from the oxidation of hydrogen and concomittantly synthesize cell material by the reductive assimilation of carbon dioxide via the ribulose bisphosphate cycle as used by plants to produce biomass.

The preferred biocatalysts of this invention are prepared by fixing a selected microorganism to a porous solid surface, preferably a porous particulate solid carrier, or support. Higher culture densities can be obtained by immobilization of the microorganisms than, e.g., suspended cell systems, and high flow rates are feasible since washout cannot occur when the microorganism is immobilized. The selection of the carrier can affect the performance of a biocatalyst in the practice of this invention since pore dimensions and surface characteristics govern both the degree of biological colonization and transport of substrate and metabolic products. Biocatalysts useful in the practice of this invention, and methods for their preparation, both in terms of suitable microorganisms and carriers, and technique for immobillzation and attachment of a selected microorganism to a support, are described, e.g., in U.S. Pat. Nos. 4,775,650 and 4,882,066, supra; and particularly U.S. Pat. No. 4,859,594, supra; the disclosures of each of which is herewith incorporated and made of record. The use of a chitinous substrate deposited on a porous solid substrate, as described, e.g., in U.S. Pat. No. 4,775,650, makes the surface particularly favorable for biological colonization. The following lists preferred microorganisms, and preferred porous solid substrates upon which the microorganisms can be immobilized and attached, to form a select class of biocatalysts for use in the practice of this invention, to wit:

TABLE

| Microorganism | Identifying Number | Substrate |
|---|---|---|
| *Xanthobacter autotrophicus* | ATCC-43050 | *Diatomaceous earth* |
| *Pseudomonas fluorescens* | ATCC-55360 | *Diatomaceous earth* |
| *Pseudomonas cepacia* | ATCC-55362 | *Diatomaceous earth* |
| *Pseudomonas fluorescens* | ATCC-55361 | *Diatomaceous earth* |

Strain ATCC-43050 is a publicly available strain. Samples of each of the other three strains listed above, ATCC-55360, ATCC-55362, and ATCC-55361, were deposited with the patent depository of the American Type Culture Collection (ATCC), 12301 Parklawn Drive, Rockville, Md. 20852 on Sep. 18, 1992, and were assigned the accession numbers stated above. These deposits were made pursuant to contracts between ATCC and the assignee of this patent application, Board of Supervisors of Louisiana State University and Agricultural and Mechanical College. The contracts with ATCC provide for permanent availability of the progeny of these strains to the public on the issuance of the U.S. patent describing and identifying the deposits or the publication or the laying open to the public of any U.S. or foreign patent application, whichever comes first, and for availability of the progeny of these strains to one determined by the U.S. Commissioner of Patents and Trademarks to be entitled thereto according to 35 U.S.C. § 122 and the Commissioner's rules pursuant thereto (including 37 C.F.R. §§ 1.14 and 1.801 et seq., with particular reference to 886 OG 638). The assignee of this application has agreed that if any of the strains on deposit should die or be lost or destroyed when cultivated under suitable conditions, it will be promptly replaced on notification with a viable culture of the same strain.

These porous solid substrates, as indicated, provide a surface on which whole cells can be attached in forming a biocatalyst. Suitable solid surface substrates to which these, and other microorganisms can be attached to form biocatalysts are described e.g., in U.S. Pat. No. 4,882,066 at Column 3, lines 12–34, herewith incorporated by reference and made part of this disclosure. The biocatalyst is packed, into the reactor and used in a steady state operation. Since the population remains in place within the reactor, a stable culture is continuously contacted with a sterile inlet feed. There is no necessity of separating a fluid from a solid phase, since the catalyst bed is fixed in place; and there is minimal backmixing. The rates of flow of the air (oxygen) and the conditioned liquid are set to maintain the dissolved oxygen (DO) concentration above some minimum necessary to the function of the selected microorganism up to a level at which the selected microorganism can function to decompose the toxic substance in the liquid influent. Preferably the flow rates are set at a level to supply the amount of oxygen which is optimum to the function of the selected microorganism; which for some microorganisms may be the point of saturation of the conditioned liquid influent with oxygen. In general, the concentration of oxygen in the conditioned liquid influent ranges from about 0.1 mg/L to about saturation, preferably from about 5 mg/L to about 6 mg/L, dependent upon the microorganism. The reactor operating pressure is controlled by regulating the pressure, P, at which the gas is delivered to the reactor. Oxygen concentration is increased by raising the air delivery pressure, and can also be increased by admixing pure oxygen in the gas supply. Overpressure can be controlled by relief valves on the influent line or reactor, or both. The flow rate of the contaminated liquid influent, or feed water, and recyle flow to the reactor, can be controlled by the pumping rates.

The following is illustrative, and exemplifies the best mode of operating a preferred type of microbubble generator and reactor, as employed in the practice of this invention. The microbubble generator and reactor employed are those described by reference to FIGS. 1–2.

EXAMPLE

The microbubble chamber of the microbubble generator was first packed with spherical glass beads of 0.5 to 3 mm diameter.

Air and an aqueous influent were then introduced into the microbubble chamber of the microbubble generator, the first mixing between the gas and liquid phases occurring with the creation of bubbles at the location of convergence between the gas and liquid phases at the gas and liquid inlets. Under an applied pressure, mixing between the gas and liquid phases was progressively increased as the fluids were transported through the microbubble chamber, the number of the bubbles increasing and the size of the bubbles decreasing. On entry, and passage of the mixture through the annular inlet into the venturi tube, the oxygenated influent was forced through the restricted opening the cross-sectional diameter of which ranged from 1.2 mm to 0.8 mm, the number of bubbles were further increased and their diameter further decreased, the oxygenated influent on egress therefrom visibly resembling a liquid within which was dispersed a fine mist. The oxygenated effluent when input to a reactor was found very well suited to providing a continual oxygen transfer to a biocatalyst constituted of a microbial mass attached to a solid support, or for facilitating export from the reactor of metabolic end products.

Figure 3:
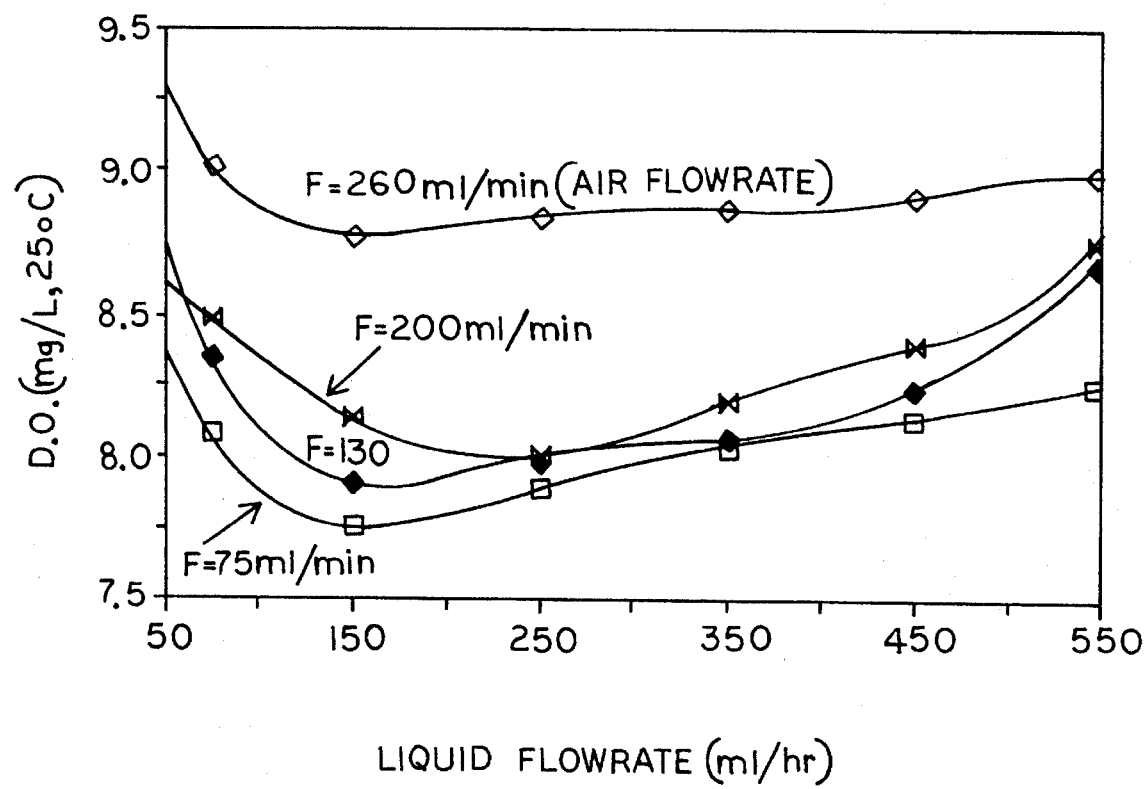
FIG. 3 is a graphical illustration of the data exemplified hereafter.

FIG. 3 graphically depicts the effectiveness of the microbubble generator in saturating an aqueous stream at flow rates between about 50 milliliters per hour, ml/hr, to 550 ml/hr, with oxygen at various air flow rates, viz., 75 ml/min, 130 ml/min, 200 ml/min and 260 ml/min, respectively. The direct oxygen (D.O.), or amount of oxygen in milligrams per liter, mg/L absorbed from the air by the water at these different flow rates is given on the y-axis, and the liquid flow rate in ml/hr through the microbubble generator is given on the x-axis.

It is thus apparent that liquid streams de ficit in oxygen can be readily, effectively oxygenated by contact with an oxygen-containing gas in apparatus as described. Hence liquid waste streams, where oxygen is present in limited amounts, if at al, can be readily oxygenated by the apparatus of this invention.

It is apparent that various modifications and changes can be made without departing the spirit and scope of this invention.

Having described the invention, what is claimed is:

1. An apparatus for facilitating high oxygen levels in a liquid, comprising:
   (a) a first chamber packed with inert solid particles of small diameter, said first chamber having at least one inlet through which an oxygen-containing gas and a liquid can be admitted under pressure into said first chamber and contacted together to form mixed liquid-gas phases in which the gas is dispersed as bubbles, and an outlet through which the mixed liquid-gas phases can be removed from said first chamber; and
   (b) a second chamber of venturi configuration, said second chamber having an inlet connected to the outlet of said first chamber through which the mixed liquid-gas phases from said first chamber can be admitted, and forced therethrough under pressure to further reduce the size of the bubbles of the mixed liquid-gas phases, and an outlet for the discharge of the mixed liquid-gas phases.

2. The apparatus of claim 1 wherein said second chamber is contained within an enclosing wall which forms at least part of said first chamber.

3. The apparatus of claim 2 wherein an enclosing wall forms said first chamber, said enclosing wall having a cover which, on removal, provides a means for the addition or removal from said first chamber of the inert solid particles.

4. The apparatus of claim 1 wherein the apparatus is of elongate shape having first and second ends, wherein each inlet of said first chamber is located near the first end, and wherein the second chamber is of a venturi configuration, the inlet of which is located near the second end and the outlet of which is located near the first end.

5. The apparatus of claim 4 wherein a drain outlet is located near the outlet from said second chamber.

6. An apparatus for facilitating high oxygen levels in a liquid, comprising a compartmented vessel, said compartmented vessel having first and second compartments, wherein:
   (a) said first compartment comprises enclosing side, top, and bottom walls, wherein said first compartment is packed with inert solid particles of small diameter, and wherein said first compartment has at least one inlet through which an oxygen-containing gas and a liquid can be admitted under pressure into said first compartment and contacted together to form mixed liquid-gas phases in which the gas is dispersed as bubbles, and an outlet through which the mixed liquid-gas phases can be discharged from said first compartment; and
   (b) a second compartment of venturi configuration, wherein said second compartment is vertically supported within and surrounded by said enclosing walls, and has an inlet through which the mixed liquid-gas phases formed within said first compartment can be introduced under pressure, and forced therethrough to further reduce the size of the bubbles of the mixed liquid-gas phases, and an outlet for the discharge of the mixed liquid-gas phases.

7. The apparatus of claim 6 wherein the apparatus is of elongate shape having first and second ends, wherein each inlet of said first compartment is located near the first end, the inlet of said second compartment is located near the second end, and the outlet of said second compartment is located near the first end.

8. The apparatus of claim 7 wherein a drain outlet is located in the wall enclosing said first compartment near the inlet to said second compartment.

9. The apparatus of claim 6 wherein at least one of said enclosing walls has a cover which, on removal, provides a means for the addition or removal from said first compartment of the inert solid particles.

* * * * *